July 19, 1960  K. E. BUCKMAN  2,945,559
FILTERS FOR FLUIDS

Filed March 2, 1959  3 Sheets-Sheet 1

Inventor
Kenneth Ernest Buckman
By
D.D. Burch Attorney

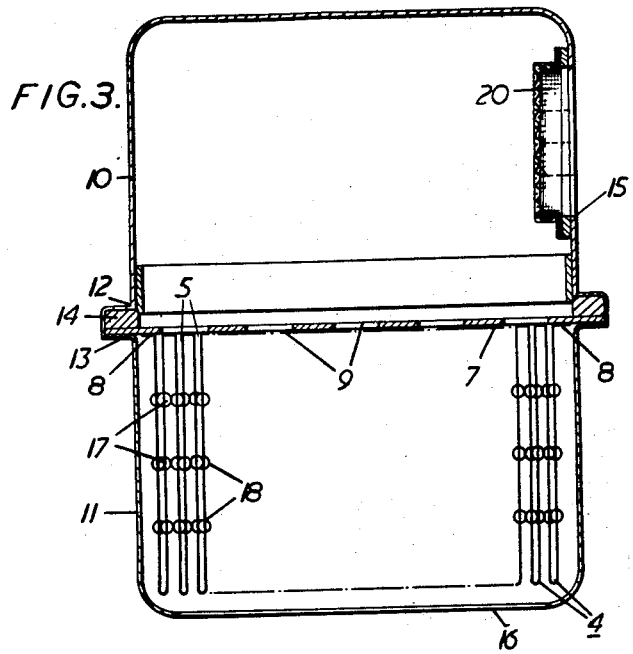
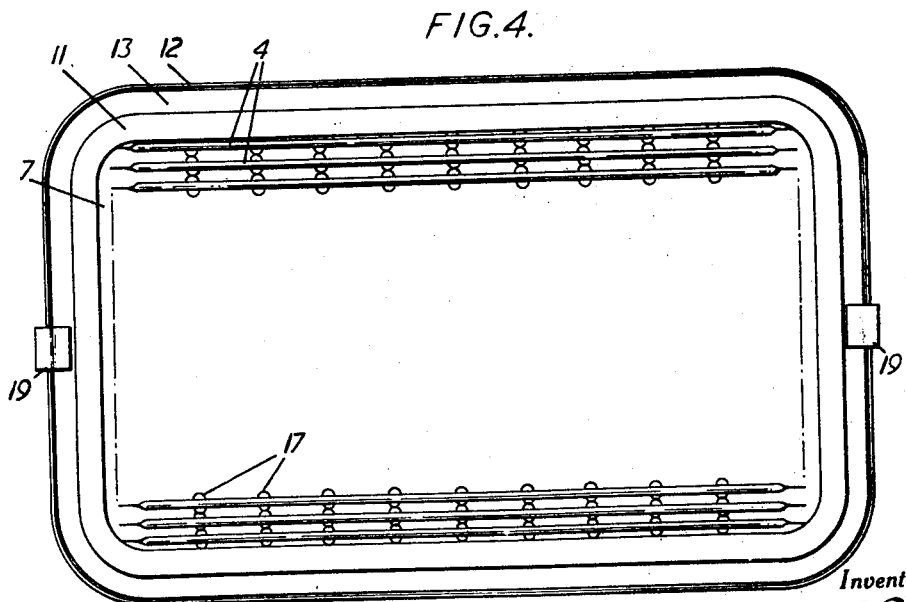

United States Patent Office 2,945,559
Patented July 19, 1960

2,945,559
FILTERS FOR FLUIDS

Kenneth Ernest Buckman, Redbridge, Southampton, England, assignor to General Motors Corporation, Detroit, Mich., a corporation of Delaware Filed Mar. 2, 1959, Ser. No. 796,344

Claims priority, application Great Britain Mar. 12, 1958

3 Claims. (Cl. 183—71)

This invention relates to filters for fluids and more particularly to filter elements for filters for fluids.

A filter element according to the invention is formed from a strip of sheet filter material folded about a series of transverse fold lines to form a series of accordion pleats the ends of each of which are sealed so as to form the pleats into a series of pockets in the form of a rectangular panel at one face of which are the open ends of the pockets, the periphery of said panel face being sealed to and within the periphery of a support sheet of impermeable material formed with perforations lying within the periphery of the panel sealed thereto.

Adjacent pleats and the two parts of each pleat are preferably spaced from each other by dimples or like formations impressed in the filter material.

Preferably the filter element is formed from filter paper impregnated with synthetic resin to control its porosity and increase its strength; and the support sheet may be of metal but is preferably of cardboard or like material which may be similarly impregnated and formed with a plurality of perforations therein.

From another aspect the invention is a fluid filter including such a filter element.

A filter for example for gasses is formed by clamping the periphery of said support sheet between the two parts of a container for the filter element, said container having an inlet and an outlet therein in communication with opposite sides of the filter element.

The scope of the invention is defined by the appended claims; and the invention and how it can be performed is hereinafter particularly described with reference to the accompanying drawings in which:

Figure 3 is a section on the line III—III of Figure 2;

Figure 4 is an inverted plan of Figure 2; and

Figure 1:
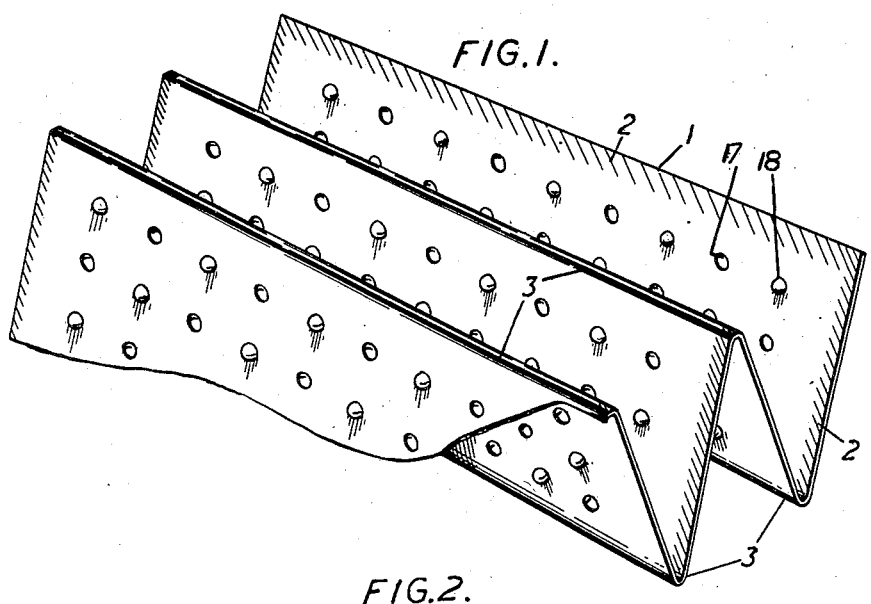
Figure 1 is a perspective view of a portion of filter paper used to form a filter element according to the invention.
Figure 2:
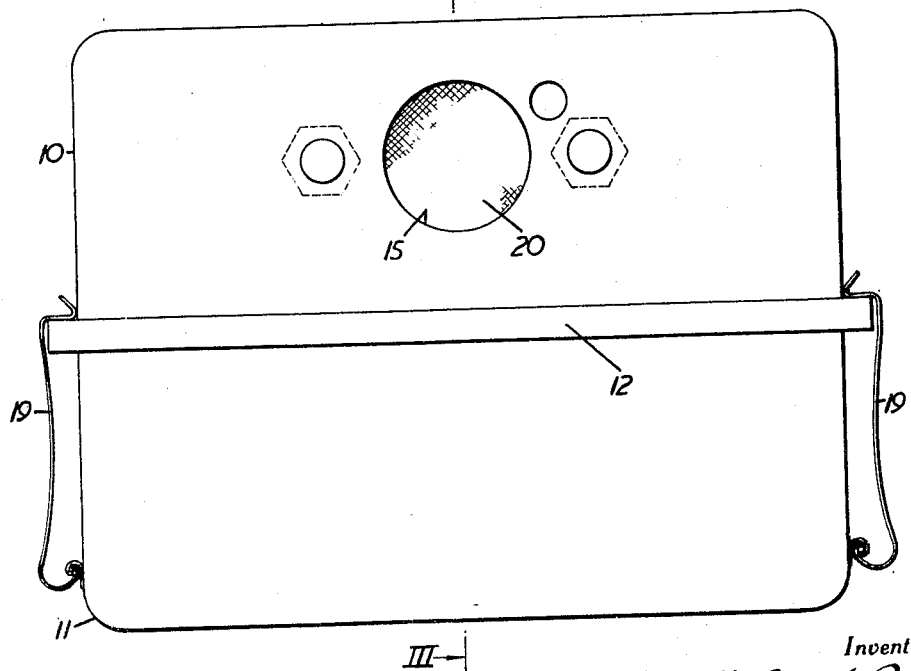
Figure 2 is an elevation of a container for the filter element.

In forming a filter element according to the invention, a strip of synthetic resin impregnated filter paper 1 has a line of adhesive 2 applied to one side of the paper along opposite longitudinal edges thereof and the strip is then folded about a series of regularly spaced transverse fold lines 3 to form the strip into a series of accordion pleats 4, the ends of each pleat being sealed by the juxtaposition of the portions of the two parts of each pleat coated with adhesive 2, so that the pleats 4 form a series of pockets the open ends 5 of which all lie in a common plane. Adhesive 2 is also applied to each transverse edge of the sheet 1.

The strip thus folded is in the form of a rectangular panel 6 which is then placed on a support sheet 7 of cardboard or like material which is of slightly larger dimensions than the panel 6, the face of the panel 6 in which lie the open ends 5 of the pockets being adjacent the support sheet 7 and the adhesive 2 applied to the edges of the strip 1 securing the series of pleats 4 to the support sheet 7 so that the periphery of the said panel face is sealed to the support sheet 7, the adhesively coated transverse edges of the sheet of filter material also being sealed to the support sheet at 8. The portion of the support sheet 7 lying within the periphery of the panel has perforations 9 therein.

The filter element thus formed is placed in a rectangular housing formed in two parts 10, 11, the free peripheral portion of the support sheet 7 being clamped between opposed flanged edges 12, 13 respectively of the two parts 10, 11 of the housing and a sealing gasket 14 preferably being interposed between the periphery of the support sheet 7 and the flanged edge 12 of the housing part 10. Alternatively a gasket may be secured to, or a gasket formation be impressed in, the free peripheral portion of the support sheet 7. As shown, the part 10 of the housing has the flange 12 thereon of channel-shape so as to retain the gasket 14 therein. The two parts 10, 11 of the housing are conveniently secured together by spring clips 19.

The part 10 of the housing is formed with an opening 15 therein by which it may be secured for example to the air intake of an internal combustion engine and the other part of the housing is formed with an opening 16 therein to admit air to one side of the filter element. A flame arrester metal gauze 20 preferably covers the opening 15 so as to prevent a flame igniting the filter element in the event of a back-fire in the engine to which the filter is fitted.

Prior to being folded, the strip of filter paper is preferably impressed with rows of spacer dimples 17, 18 or like formations, so that the two parts of each pleat 4 are spaced from each other, and adjacent pleats 4 are spaced from each other.

For use as an air cleaner in an internal combustion engine the filter element panel 6 and the housing 10, 11 therefor are preferably arranged so that the pleats 4 of the panel 6 depend downwardly from the said support sheet 7, this position enabling dust deposited on the pleats of the filter element to fall freely from the latter under gravity, thereby reducing the clogging of the filter by the accumulation of impurities therein.

Figure 5:
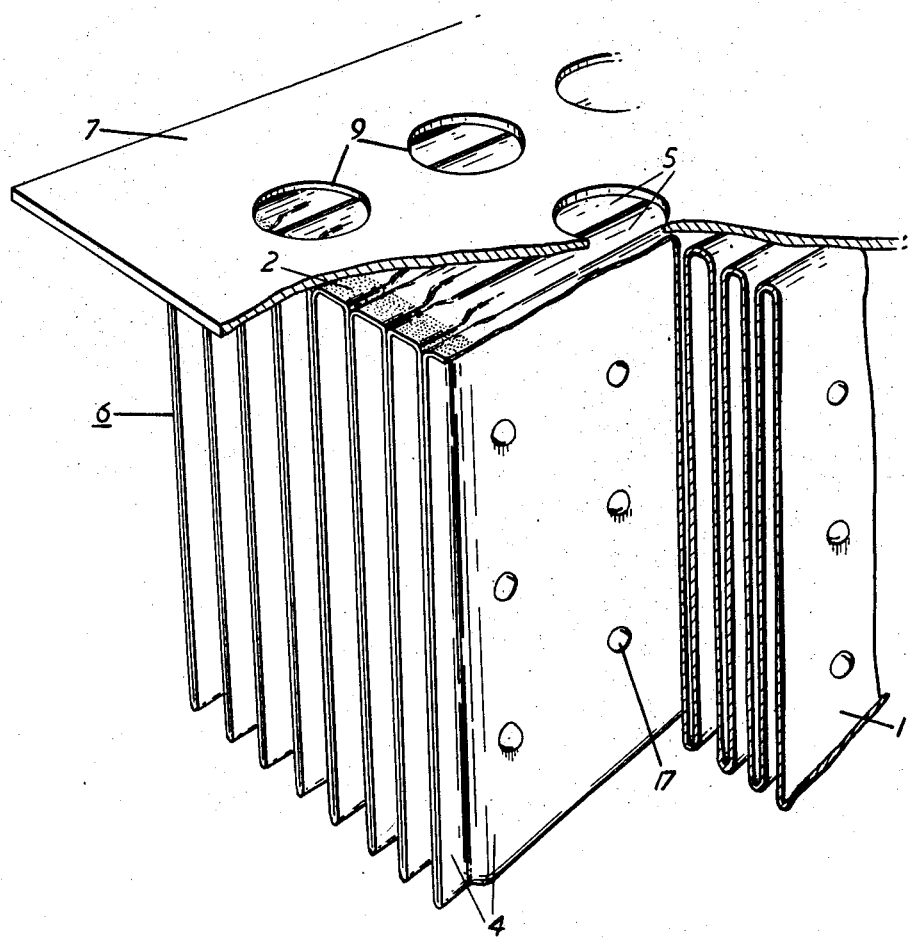
Figure 5 is an enlarged perspective view, partly broken away, of the filter element shown in Figures 3 and 4.

The parts of the strip of filter paper adjacent the ends of the pleats 4 which are secured to the support sheet 7 are preferably formed so that the folds are of rectangular rather than rounded form, as shown in Figure 5, such an arrangement facilitating the proper sealing of the periphery of the filter element panel 6 to the support sheet 7.

The housing part 10 is preferably formed to act as, or to include a silencer chamber.

I claim:

1. An air filter, comprising a filter housing formed of two hollow parts removably secured together at flanged peripheral portions on each, a filter element located within the housing and formed of a strip of synthetic resin-impregnated filter paper folded about a series of transverse fold lines to form a series of accordion pleats, the ends of each of which are adhesively sealed at the edges so as to form the pleats into a series of pockets in the form of a rectangular panel at one face of which are the open ends of the pockets, the periphery of said panel face being adhesively sealed at the edges to and within the entire periphery of a support sheet of impermeable material formed with perforations lying within the periphery of the panel sealed thereto, and the periphery of the support sheet being removably clamped between the flanged peripheral portions of the housing parts for ready replacement of the filter element.

2. An air filter according to claim 1, in which adjacent pleats and the two parts of each pleat are spaced from each other by spacer formations impressed in the strip and wherein the pleats extend downwardly from the support sheet to enable gravity removal of dust from the filter element.

3. An air filter according to claim 2, in which the two housing parts each have an opening therein, one opening being above the other and adapted for connection to the air intake of an internal combustion engine and the other being on the bottom of the housing and forming an air inlet to the bottom side of the filter element and providing an exit for dust that falls off the filter element.

References Cited in the file of this patent

UNITED STATES PATENTS

| | | |
|---|---|---|
| 1,708,065 | Jordahl | Apr. 9, 1929 |
| 1,779,458 | Annis | Oct. 28, 1930 |
| 2,510,440 | Vokes | June 6, 1950 |
| 2,569,243 | Kovacs | Sept. 25, 1951 |
| 2,640,560 | Lewis et al. | June 2, 1953 |
| 2,784,802 | Bub | Mar. 12, 1957 |
| 2,853,154 | Rivers | Sept. 23, 1958 |